United States Patent [19]

Sasaki

[11] Patent Number: 5,051,820

[45] Date of Patent: Sep. 24, 1991

[54] COLOR IMAGE RECORDING APPARATUS CAPABLE OF RECORDING COLOR GRADATION PATTERN

[75] Inventor: Ichiro Sasaki, Nagoya, Japan

[73] Assignee: Brother Kogyo Kabushiki Kaisha, Aicki, Japan

[21] Appl. No.: 385,058

[22] Filed: Jul. 26, 1989

[30] Foreign Application Priority Data

Jul. 26, 1988 [JP] Japan ............... 63-185876
Oct. 24, 1988 [JP] Japan ............... 63-267789

[51] Int. Cl.⁵ .............................. H04N 1/46
[52] U.S. Cl. ........................ 358/80; 358/78
[58] Field of Search ............ 358/75, 78, 80, 76, 358/296

[56] References Cited

U.S. PATENT DOCUMENTS

| | | | |
|---|---|---|---|
| 4,674,861 | 6/1987 | Kawamura | 358/75 |
| 4,730,185 | 3/1988 | Springer et al. | 358/78 |
| 4,792,847 | 12/1988 | Shimazaki et al. | 358/75 |
| 4,819,193 | 4/1989 | Imao | 358/75 |
| 4,893,180 | 1/1990 | Shigaki et al. | 358/80 |
| 4,931,861 | 6/1990 | Taniguchi | 358/80 |

FOREIGN PATENT DOCUMENTS

1-168167 7/1989 Japan .

Primary Examiner—Howard W. Britton
Assistant Examiner—Kim Y. Vu
Attorney, Agent, or Firm—Oliff & Berridge

[57] ABSTRACT

A color image recording apparatus such as a color printer records a color image based on color image data supplied from an external source such as a host computer. The color image recording apparatus includes a memory for storing an image color change pattern as a function of a recording position, a central processing unit for calculating an image color at a recording position according to the function, and a color image recorder for recording a color image on a recording medium in the calculated image color at the recording position. The memory may store a color change pattern on a background free of color image data, and the central processing unit may calculate a background color based on the color change pattern on the background which is stored in the memory.

4 Claims, 6 Drawing Sheets

COLOR IMAGE RECORDING APPARATUS CAPABLE OF RECORDING COLOR GRADATION PATTERN

BACKGROUND OF THE INVENTION

The present invention relates to a color image recording apparatus for recording image data which have been supplied from an external source in a selectable range of color quality values on print media.

Color image recording apparatus record color images in response to color commands applied by an external source such as a host computer. The color commands are included in image data supplied from the host computer.

The conventional color image recording apparatuses are capable, as hardware, of recording images in complex color patterns such as gradation patterns including continuous ranges of lightness, hues, and saturations, as well as in simple colors. If image data indicating a gradation are supplied from the host computer to the color image recording apparatus, then the color image recording apparatus can record an image having the gradation represented by the image data.

Most image recording software presently available in the market does not take into account the reproduction of such gradations. Existing image recording software cannot be relied upon in recording gradation images on the color image recording apparatus.

Therefore, the ability of the color image recording apparatus to record images in gradation patterns has not been fully put to use.

It may be possible to record images in gradation patterns on the color image recording apparatus by including gradation image data in the software which instructs the host computer. In order to include gradation image data in the software, an image to be recorded in a gradation pattern must be divided into small regions, and colors must be specified for the respective regions. Such a process is not practical as it would be tedious and time-consuming, require a large memory capacity, and places a larger burden on the host computer software.

There is also known a color image recording apparatus which automatically adds a color to a background, by designating such a background color, when image data containing no command for recording any color in the background are supplied to the color image recording apparatus.

If a dark tone is designated as a background color, then a recorded foreground image looks lighter and stands out in sharp relief against the background.

Heretofore, only a single background color tone can be designated. A background color recorded in a single tone makes the image look plane.

SUMMARY OF THE INVENTION

In view of the aforesaid drawbacks of the conventional color image recording apparatus, it is an object of the present invention to provide a color image recording apparatus which can record an image in a complex color pattern such as a gradation by either including simple data in software which instructs an external device that controls the color image recording apparatus or simply operating the color image recording apparatus.

Another object of the present invention is to provide a color image recording apparatus which can present a high-quality image against a background that is recorded in a selectable range of color quality values such as toner depending on the position in a print area.

According to the present invention, there is provided color image recording apparatus for recording a color image based on color image data supplied from an external source, comprising memory means for storing an image color change pattern as a function of a recording position, processing means for calculating an image color at a recording position according to the function, and recording means for recording a color image on a recording medium in the calculated image color at the recording position.

The memory means includes a first memory for storing a plurality of selectable image color change patterns, and a second memory for storing data which indicate a selected one of the image color change patterns.

The memory means includes means for storing a color change pattern on a background free of color image data, the processing means including means for calculating a background color based on the color change pattern on the background which is stored in the storing means of the memory means.

The above and other objects, features and advantages of the present invention will become more apparent from the following description when taken in conjunction with the accompanying drawings in which preferred embodiments of the present invention are shown by way of illustrative example

DETAILED DESCRIPTION OF THE PREFERRED EMBODIMENTS

Figure 1:
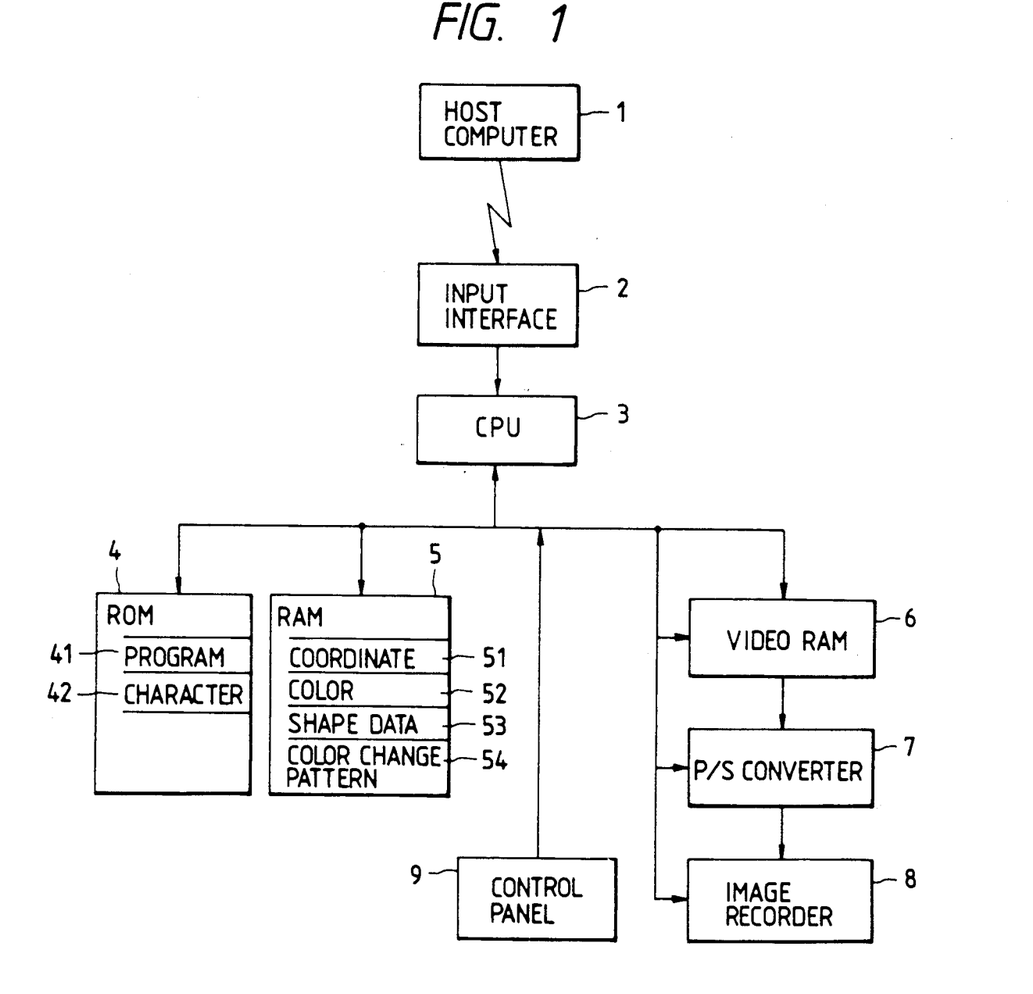
FIG. 1 is a block diagram of a color image recording apparatus according to an embodiment of the present invention.

FIG. 1 shows a color image recording apparatus such as a color printer according to an embodiment of the present invention. The color image recording apparatus comprises an input interface 2 for receiving image data from a host computer 1, a central processing unit (CPU) 3 for processing received data and controlling the entire apparatus, a read-only memory (ROM) 4 for storing a program and other data, a random access memory (RAM) 5, a video random access memory (RAM) 6 for storing color image data to be recorded, a parallel-to-serial converter 7 for converting parallel data read from the video RAM 6 into serial data, an image recorder B for recording a color image based on the output data from the parallel-to-serial converter 7, and a control panel 9 comprising a keyboard, for example, for entering commands. The image recorder 8 may comprise a dot-matrix print unit for printing an image with a multicolor ink ribbon or an ink-jet print unit for printing an image with an ink jet.

The ROM 4 includes a program area 41 and a character area 42 serving as a character generator.

The RAM 5 includes a coordinate area 51, a color area 52, a shape data area 53, and a color change pattern area 54, all storing corresponding data based on image data supplied from the host computer 1. The color change pattern area 54 serves to store color change pattern data entered from the host computer 1.

The color change pattern data represent a color change pattern such as a color gradation indicating lightness, hues, or saturations, the color change pattern being represented by a formula showing the relationship between a printing position and a printing color. The lightness, hue, or saturation at each printing position is represented as a function of the printing position. The color change pattern data may be included in the software which instructs the host computer 1, or may be supplied by operating a control panel of the host computer 1 when image data are fed from the host computer 1 to the color image recording apparatus.

The CPU 3 receives image data and data such as commands from the host computer 1 through the input interface 2, and controls recording operation of the image recorder 8 based on the received data The CPU 3 functions as a calculating means for calculating the printing color at each printing position according the formula stored in the RAM 5.

A control sequence of the CPU 3 will be described below with reference to FIG. 2.

When the power supply of the color image recording apparatus is turned on, the CPU 3 is initialized according to a program stored in the ROM 4 in step S1. Then, it is checked in step S2 whether there is a control input signal from the control panel or not. If there is a control input signal, then the control input signal is processed in step S3 and the processing returns to step S2. If no control input signal is supplied, then it is checked in step S4 whether there have been data applied from the host computer 1 or not. If no data have been applied, control enters a loop for awaiting such data.

If data have been applied, then it is checked in step S5 whether the applied data are character data or not. If the applied data are character data, then control advances to a routine R1 of steps S6 through S8 in preparation for printing characters.

In the routine R1, character data in the character area 42 of the ROM 4 are accessed and the character pattern is sent to the video RAM 6 in step S6. Then, the printing position is updated into a next printing position in step S7, which is followed by step S8 where it is checked whether the next printing position is within the range of a present page or not. If not, steps S2 through S7 are repeated until the printing position enters the next page.

If the printing position enters the next page, control then enters a recording routine R2 of steps S9 through S12 for recording the data on the present page.

A print command is set to the image recorder 8 in step S9, and then the data from the video RAM 6 are delivered successively to the image recorder 8 in step S10. At this time, the data supplied from the video RAM 6 to the image recorder 8 are the character pattern data. Then, it is checked in step S11 if the recording of the data on the present page has been completed or not. If completed, then the data for the present page are cleared in step S12, and the processing returns to step S2.

If the data applied from the host computer 1 are not character data in step S5, then processing for other data than character data will be effected in step S13 and following steps.

In step S13 it is checked whether the applied data are color designating data or not. If the applied data are color designating data, then the color designating data are stored in the color area 52 of the RAM 5 in step S14.

In step S15, it is checked whether the applied data are shape designating data or not. If the applied data are shape designating data, then the shape designating data are stored in the shape data area 53 of the RAM 5 in step S16.

In step S17, it is checked whether the applied data are color change pattern data or not. If the applied data are color change pattern data, then the color change pattern data are stored in the color change pattern area 54 of the RAM 5 in step S18.

In step S22, it is checked whether the applied data include a full-area color print command for fully recording a certain area with a certain color change pattern. If the applied data include a full-area color print command, then a printing color for each point in the shape stored in the shape data area 53 of the RAM 5 is calculated according to the formula of the color change pattern. Shape data including the calculated color are then stored in the video RAM 6 in step S21.

In step S22, is is checked whether the applied data include a print execution command or not If a print executing command is included, then control enters the recording routine R2. In the recording routine R2, image data having a color change pattern such as a gradation are supplied from the video RAM 6 to the image recorder 8 and recorded on a certain recording medium such as a sheet of print paper by the image recorder 8. Therefore, a color image with hues, lightness, or saturations which vary continuously or stepwise is recorded by the image recorder 8.

If, in step S22, no recording execution command is included, the applied data are processed according to another processing routine in step S23.

Figure 3:
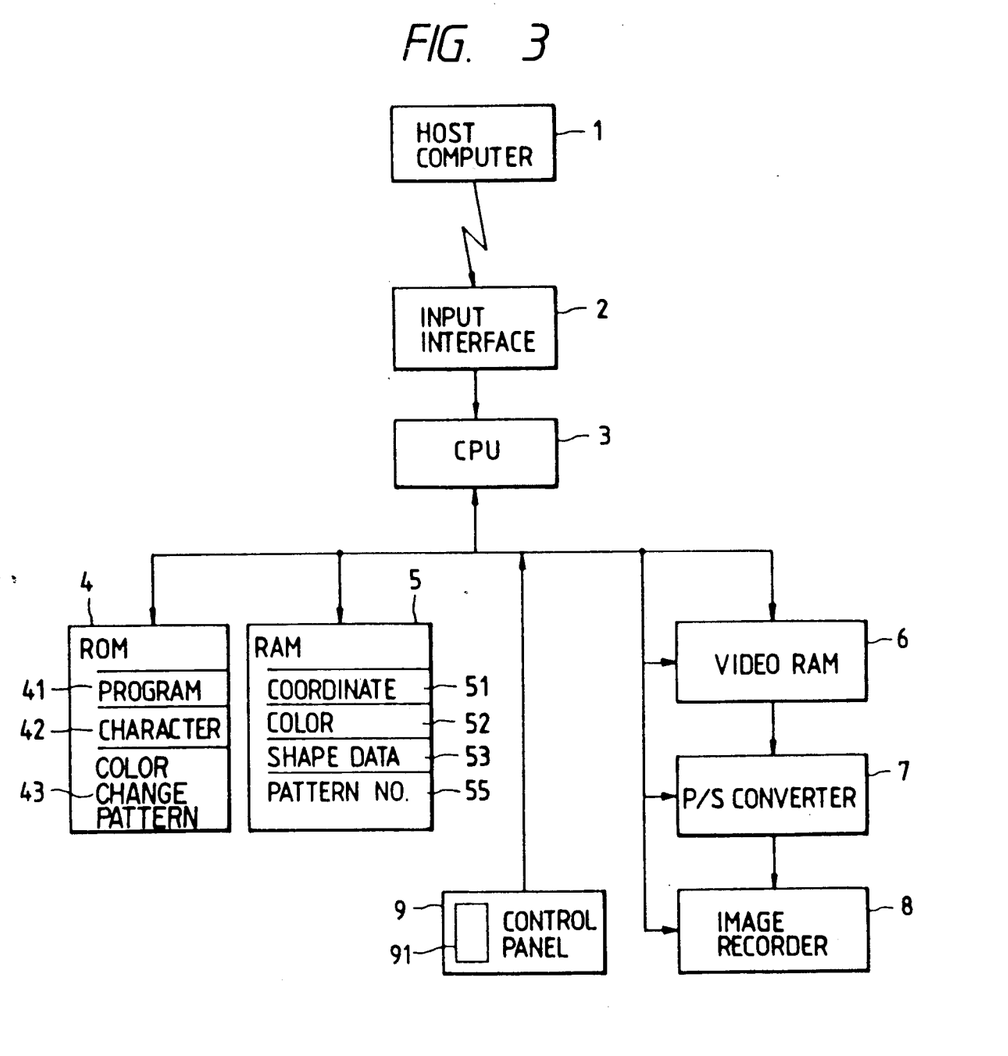
FIG. 3 is a block diagram of a color image recording apparatus according to another embodiment of the present invention.

FIG. 3 shows a color image recording apparatus according to another embodiment of the present invention.

The color image recording apparatus shown in FIG. 3 differs from the color image recording apparatus of FIG. 1 only in that the ROM 4 additionally has color change pattern area 43 for storing data representing a plurality of color change patterns, the RAM 5 has a pattern number area 55, rather than the color change pattern area 54 in FIG. 1, for storing a pattern number indicating one of the color change patterns stored in the ROM 4, and the control panel 9 includes a selector switch 91 for selecting one of the stored color change patterns.

As in the embodiment shown in FIG. 1, the color change pattern date represent a color change pattern such as a color gradation indicating lightness, hues, or saturations, the color pattern being represented by a formula showing the relationship between a printing position and a printing color. The lightness, hue, or saturation at each printing position is represented as a function of the printing position. The color change pattern data representing a plurality of color change patterns are stored in the ROM 4. The pattern number area 55 of the RAM 5 stores the number of a color change pattern selected by the selector switch 91.

Figure 4:
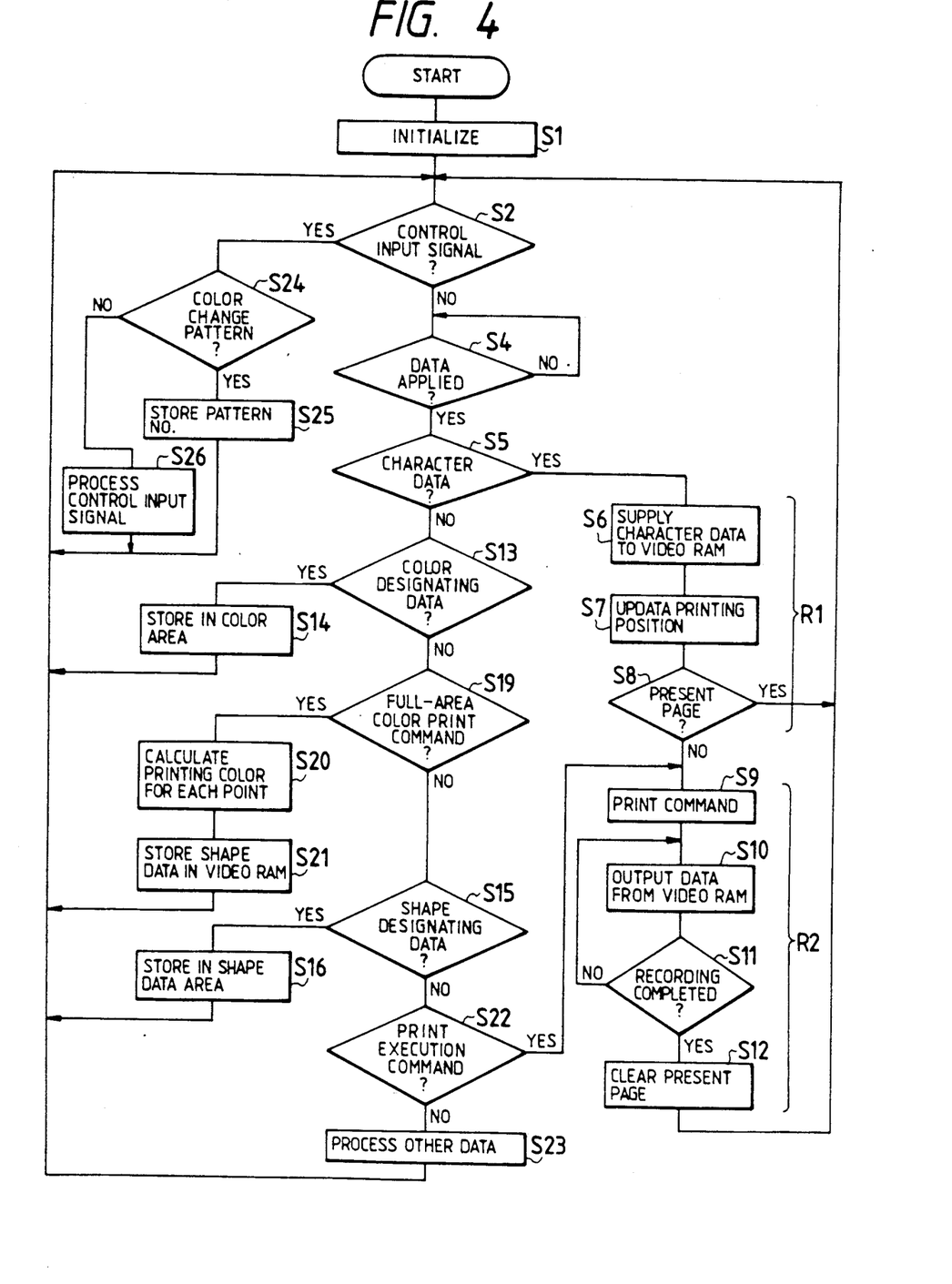
FIG. 4 is a flowchart of a control sequence of the color image recording apparatus shown in FIG. 3.

FIG. 4 shows a control sequence of the color image recording apparatus shown in FIG. 3. The control sequence of FIG. 4 includes those steps which are identical to those shown in FIG. 2, and those identical steps are denoted by identical reference characters and will not be described in detail.

Figure 2:
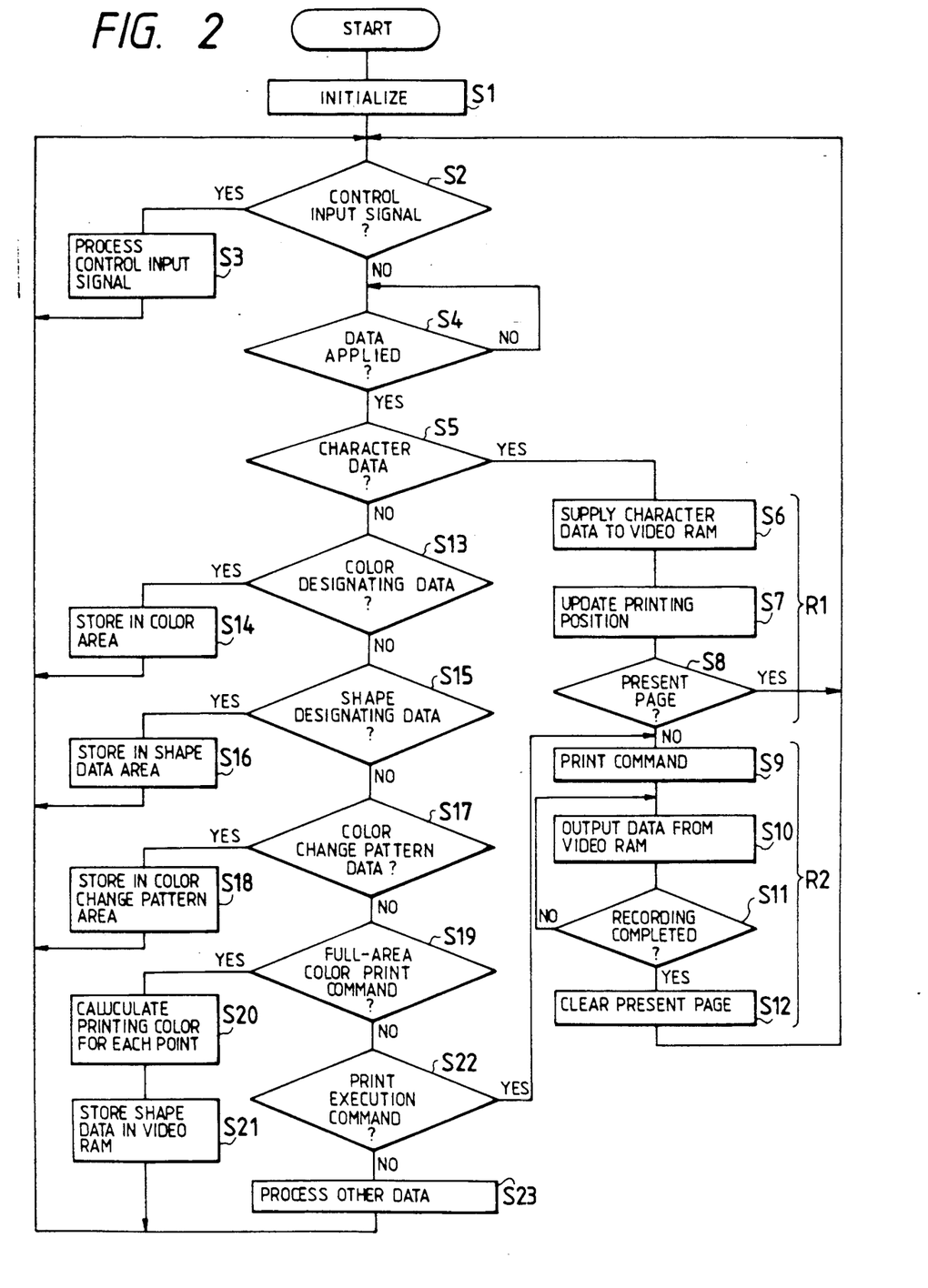
FIG. 2 is a flowchart of control sequence of the color image recording apparatus shown in FIG. 1.

Steps S1, S2, S4 through S14 shown in FIG. 4 are in the same order as those shown in FIG. 2. Steps S19, S20, S21 are executed after step S13, and steps S15, S16 are effected after step S19. Steps S22, S28 come after step S15.

If there is a control input signal from the control panel, then it is checked in step S24 whether the control input signal designates a color change pattern or not, i.e., whether the selector switch 91 has been operated upon or not. If the control input signal designates a color change pattern, then the number of the selected color change pattern is stored in the pattern number area 55 of the RAM 5, and processing returns to step S2. If the control input signal represents a command other than a color change pattern, then the command is processed in step S26, from which the processing returns to step S2.

The selected color change pattern (which represents the formula indicating the relationship between a printing position and a printing color) is accessed in step S20 based on the pattern number stored in the pattern number area 55 of the RAM 5 in step 20. Then, based on the formula of the color change pattern, a printing color for each point in the shape stored in the shape data area 53 of the RAM 5 is calculated, end shape data including the calculated color are then stored in the video RAM 6 in step 21.

With the aforesaid embodiments, color images can be recorded in complex color change patterns, such as gradations, simply by including simple data in host computer software or simply operating the color image recording apparatus. Therefore, the function of the color image recording apparatus can fully be performed to reproduce high-quality color images.

More specifically, if data on a formula of color change patterns are to be stored from the host computer into the memory of the color image recording apparatus, the software which instructs the host computer is only required to include data on such a formula. It is not tedious and time-consuming to include such formula data into the software, no large memory capacity is needed, and no large burden is placed on the software.

If formulas of color change patterns are stored in the memory of the color image recording apparatus, the user is only required to select one of such color change patterns for recording an image in the selected color change pattern, and no complex control procedure is required.

Figure 5:
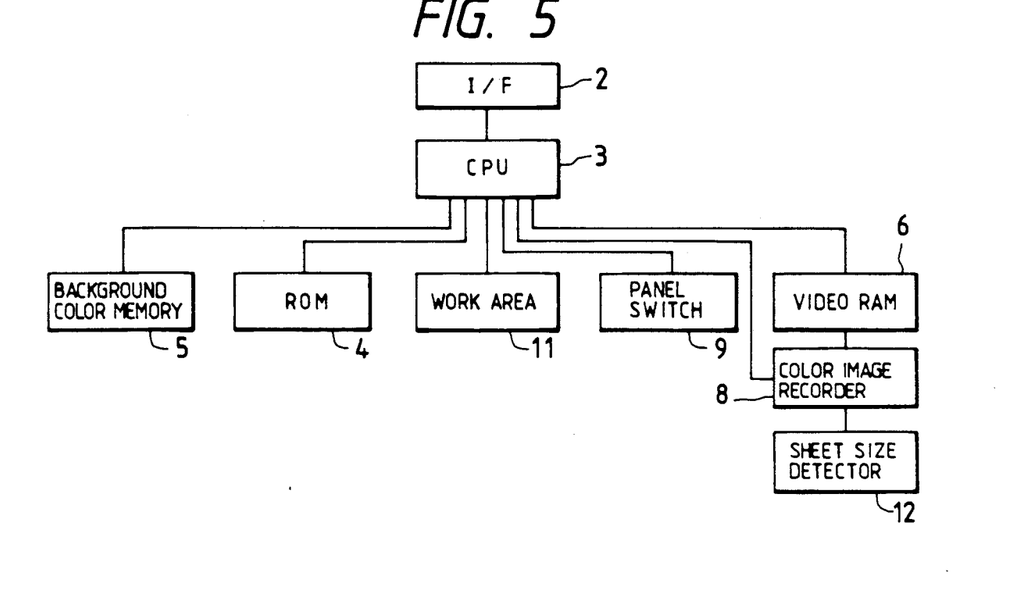
FIG. 5 is a block diagram of a color image recording apparatus according to still another embodiment of the present invention.

FIG. 5 shows a color image recording apparatus according to still another embodiment of the present invention. The color image recording apparatus comprises an input interface 2 for receiving image data from an external source such as a host computer, a CPU 3 for processing the receiving image data and controlling the entire apparatus, a ROM 4 for storing a program and other data, a background color memory 5 for storing background colors that are functions of printing positions, a working memory 11, such as ROM for storing data produced during processing operation, a video RAM 6 for storing color image data to be recorded, a color image recorder 8 for recording a color image on a recording medium such as a sheet of print paper, a control panel 9 such as a keyboard for entering commands, and a sheet size detector 12.

Background color designating data end foreground color designating data are supplied from the input interface 2. Background color designating data are stored in the background color memory 5. Background colors are designated in terms of the brightness (ranging from 0 to 1) of each of red (R), green (G), blue (B). A background color may be designated as a function directly by the user, or by a color change curve stored in the apparatus according to an initial default setting. One of these two modes can be selected by a command entered by the control panel 9.

Figure 6:
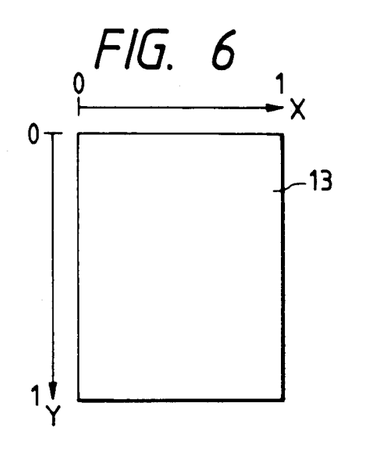
FIG. 6 is a diagram showing the relationship between a sheet of print paper and coordinates in the color image recording apparatus shown in FIG. 5.

In the mode in which the user directly designates a background color through a function, a coordinate system for such a function as shown in FIG. 6 is employed. The coordinate system has its original at the upper left corner of a sheet 13 of print paper, and the vertical and horizontal dimensions of the sheet size as detected by the sheet size detector 12 are each set to "1". This coordinate system setting allows the same color changes to be obtained even if the sheet size is varied.

If settings such as G=O, R=O, $$0 \leq y \leq 0.3 \quad B = 0.2,$$
$$0.3 \leq y \leq 1.0 \quad B = \sqrt{y - 0.3}$$

are selected, then these settings are stored in the background color memory 6.

If combining background and foreground image data is commanded by the control panel 9, then the CPU 2 calculate printing positions from the addresses of the video RAM 6 which stores one-page image data, normalizes the printing positions according to the sheet size stored in the working memory 11, calculates colors or tones at the points corresponding to the addresses of the video RAM 6 based on the background color data stored in the background color memory 5, and then stores the calculated color data into the video RAM 6. Then, the background color data are written in a data-free area of a foreground image which has been supplied to the video RAM 6. Alternatively, a foreground image which is supplied to the video RAM 6 is written over the background color data in the video RAM 6. In this manner, the foreground image is combined with the background having its tone varying depending on the printing position.

Then, the CPU 2 sends a print command to the color image recorder 8 and delivers the image data from the video RAM 5 to the color image recorder 8 in synchronism with operation of the color image recorder 8, thereby recording the image data on a sheet of print paper.

Figure 7:
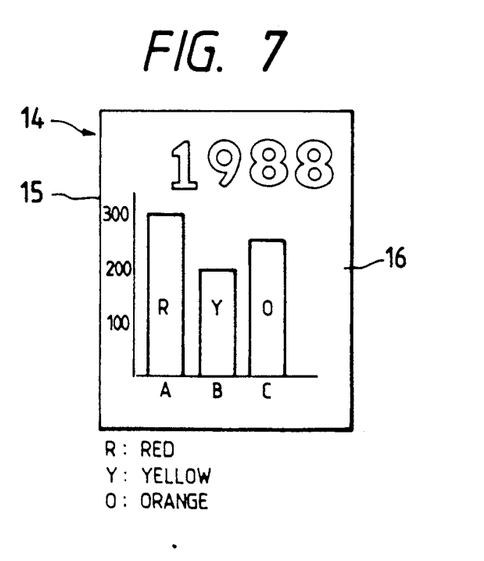
FIG. 7 is a view showing, by way of example, an output print produced by the color image recording apparatus shown in FIG. 5.

FIG. 7 shows an image recorded by the above process. A foreground image 15 which is represented by the supplied image data is printed on a sheet 14 of print paper, and a data-free area 16 is printed with a background color in a range of tones that progressively vary from a dark tone to a light tone in the downward direction.

Figure 8:
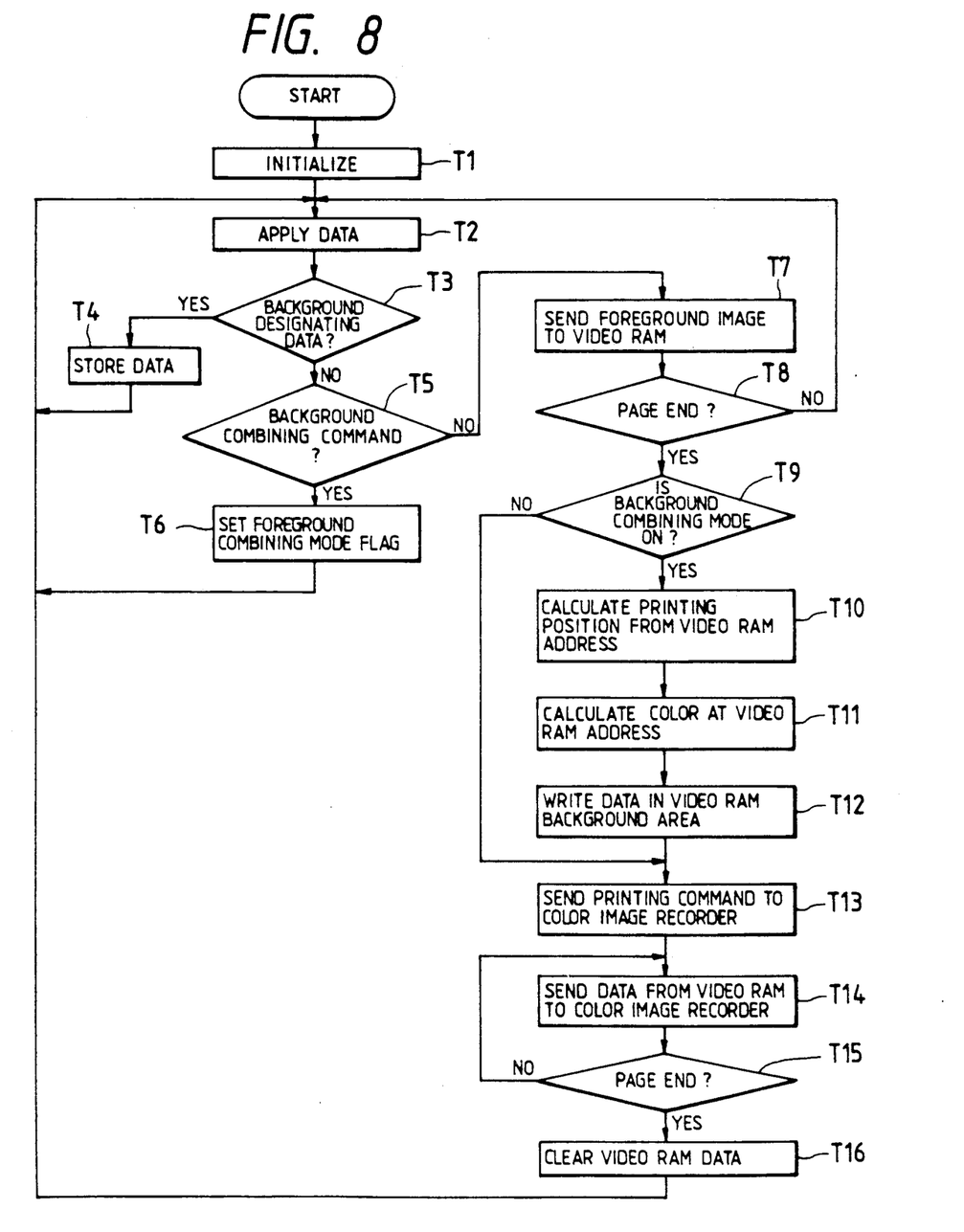
FIG. 8 is a flowchart of a control sequence of the color image recording apparatus of FIG. 5.

FIG. 8 shows a control sequence of the color image recording apparatus. After the color image recording apparatus has been energized, the CPU 3 is initialized for a format such as line numbers per page and other data in step T1. Then, image data are applied to the CPU 3 in step T2. In step T3, it is checked whether the applied image data are background color designating data or not. If the applied data are background color designating data, then these data are stored in the background color memory 5. The background color designating data are represented as a function of printing positions. If the applied data are not background color designating data, then the processing advances to step T5 which determines whether a background combining command is applied from the control panel 9 or not. If yes, then a background combining mode flag is set in step T6.

If the applied data are foreground image data and background combining command is not applied, then the foreground image data are stored at corresponding addresses in the video RAM 6 in step T7. Step T7 is followed by step T8 in which it is checked whether a page end is reached or not. Steps T2, T3, T5, T7 and T8 are repeated until a page end is reached. After a page end is reached, it is checked in step T9 whether the background combining mode is ON or not from the background combining mode flag. If the background combining mode is ON, then the CPU 3 calculates printing positions from the addresses of the video RAM 6 in step T10, calculates background color tones for the printing positions based on the background color designating data stored in the background color memory 5 in step T11, and writes the calculated data in a background area of the video RAM 6 in a step T12. Then, the CPU issues a print command to the color image recorder 8 in step T13.

If the background combining mode is not ON, then control skips steps T10 through T12, and jumps from the step T9 to step T13.

When a print command is issued in step T13, the image data from the video RAM 6 are supplied to the color image recorder 8 until a page end is reached in steps T14, T15. When a page end is reached, the image data are cleared from the video RAM 6 in step T16, from which control returns to step T2. Then, the above process is repeated.

In the above flowchart, a foreground image is first stored in the video RAM 5 and then a background color is written therein. However, a background color may first be written, and then a foreground image may be stored over the background color.

With the embodiment shown in FIGS. 5 through 8, a background color tone is stored as a function of a printing position, and foreground image data and the background color are combined to form an image. Since the background color can be shaded or tinted depending on the printing position, a high-quality color image can be produced by the color image recording apparatus.

Although certain preferred embodiments have been shown and described, it should be understood that many changes and modifications may be made therein without departing from the scope of the appended claims.

What is claimed is:

1. A color image recording apparatus for recording a color image based on color image data supplied from an external source, comprising:
   memory means for storing an image color change pattern as a function of a recording position;
   processing means for calculating an image color at a recording position according to said function; and
   recording means for recording a color image on a recording medium in the calculated image color at the recording position, wherein said memory means stores a color change pattern on a background free of color image data, said processing means including means for calculating a background color based on the color change pattern on the background which is stored in said memory means.

2. A color image recording apparatus according to claim 1, wherein said memory means comprises a first memory for storing a plurality of selectable image color change patterns, and a second memory for storing data which indicate a selected one of the image color change patterns.

3. A color image recording apparatus according to claim 1, wherein said color change pattern represents a range of color quality values.

4. A color image recording apparatus according to claim 1, wherein said color change pattern represents a range of tones.

* * * * *